United States Patent
Siebers et al.

(10) Patent No.: US 9,446,982 B2
(45) Date of Patent: Sep. 20, 2016

(54) TRANSPARENT OR TRANSPARENT COLORED LITHIUM ALUMINUM SILICATE GLASS CERAMIC ARTICLES HAVING ADAPTED THERMAL EXPANSION AND USE THEREOF

(75) Inventors: Friedrich Siebers, Nierstein (DE); Evelin Weiss, Mainz (DE); Klaus Schoenberger, Mainz (DE)

(73) Assignee: SCHOTT AG, Mainz (DE)

( * ) Notice: Subject to any disclaimer, the term of this patent is extended or adjusted under 35 U.S.C. 154(b) by 8 days.

(21) Appl. No.: 13/811,798

(22) PCT Filed: May 17, 2011

(86) PCT No.: PCT/EP2011/057947
§ 371 (c)(1),
(2), (4) Date: Mar. 8, 2013

(87) PCT Pub. No.: WO2012/010341
PCT Pub. Date: Jan. 26, 2012

(65) Prior Publication Data
US 2013/0164509 A1 Jun. 27, 2013

(30) Foreign Application Priority Data
Jul. 23, 2010 (DE) .................. 10 2010 032 113

(51) Int. Cl.
C03C 17/04 (2006.01)
C03C 10/14 (2006.01)
C03C 10/00 (2006.01)
C03C 14/00 (2006.01)
F24B 13/00 (2006.01)
F24C 15/10 (2006.01)

(52) U.S. Cl.
CPC ....... *C03C 10/0054* (2013.01); *C03C 10/0027* (2013.01); *C03C 10/0045* (2013.01); *C03C 14/00* (2013.01); *F24B 13/004* (2013.01); *F24C 15/10* (2013.01); *C03C 17/04* (2013.01); *Y10T 428/24926* (2015.01); *Y10T 428/265* (2015.01)

(58) Field of Classification Search
None
See application file for complete search history.

(56) References Cited

U.S. PATENT DOCUMENTS

| | | | |
|---|---|---|---|
| 3,617,317 A | 11/1971 | Sack et al. | |
| 4,018,612 A | 4/1977 | Chyung | |
| 4,211,820 A | 7/1980 | Cantaloupe | |
| 4,438,210 A * | 3/1984 | Rittler | 501/4 |
| 4,455,160 A * | 6/1984 | Rittler | 65/30.13 |
| 4,707,458 A * | 11/1987 | Chyung et al. | 501/4 |
| 5,070,045 A * | 12/1991 | Comte et al. | 501/4 |
| 5,491,115 A * | 2/1996 | Pfitzenmaier et al. | 501/4 |
| 6,043,171 A * | 3/2000 | Siebers et al. | 501/66 |
| 6,593,258 B1 * | 7/2003 | Shimatani et al. | 501/4 |
| 2003/0006231 A1 | 1/2003 | Nagata et al. | |
| 2006/0142138 A1 | 6/2006 | Sakamoto | |
| 2007/0004578 A1 | 1/2007 | Monique Comte | |
| 2007/0129231 A1* | 6/2007 | Comte | 501/4 |
| 2008/0026927 A1 | 1/2008 | Monique Comte | |
| 2010/0167903 A1* | 7/2010 | Comte et al. | 501/27 |
| 2010/0304948 A1* | 12/2010 | Comte et al. | 501/32 |
| 2011/0160033 A1* | 6/2011 | Yamauchi | C03B 18/02 501/69 |
| 2011/0226231 A1* | 9/2011 | Siebers | C03C 3/087 126/211 |

FOREIGN PATENT DOCUMENTS

| | | |
|---|---|---|
| CN | 1333194 A | 1/2002 |
| CN | 101213151 A | 7/2008 |
| DE | 19721737 | 11/1998 |
| DE | 19939787 | 2/2001 |
| DE | 102008050263 | 4/2010 |
| EP | 1114803 | 7/2001 |
| EP | 1170264 | 1/2002 |
| EP | 1837312 | 9/2007 |
| FR | 2405906 | 5/1979 |
| JP | 1308845 | 12/1989 |
| JP | 11100229 | 4/1999 |
| JP | 11100230 | 4/1999 |
| JP | 2010096390 A | 4/2010 |
| WO | 02/16279 | 2/2002 |
| WO | 2009115725 A2 | 9/2009 |
| WO | WO2010026854 A * | 3/2010 |
| WO | 2010040443 A2 | 4/2010 |

OTHER PUBLICATIONS

Translation of DE 19939787 Siebers et al. Feb. 2001.*
International Preliminary Report on Patentability dated Jan. 23, 2013 corresponding to International Patent Application No. PCT/EP2011/057947.
English translation of the International Search Report dated Oct. 6, 2011 corresponding to International Patent Application No. PCT/EP2011/057947.
Chinese Office Action dated Aug. 20, 2014 for corresponding Chinese Patent Application No. 201180035224.0 with English translation, 31 Pages.
English translation of the Written Opinion of the International Searching Authority dated Oct. 6, 2011 corresponding to International Patent Application No. PCT/EP2011/057947, 14 pages.
English translation of Japanese Office Action dated Sep. 18, 2014 for corresponding Japanese Patent Application No. 2013-520017, 3 Pages.

* cited by examiner

*Primary Examiner* — David Sample
(74) *Attorney, Agent, or Firm* — Olhlandt, Greeley, Ruggiero & Perle, LLP

(57) ABSTRACT

Transparent or transparent dyed lithium aluminum silicate (LAS) glass ceramic material is provided that has an adapted thermal expansion. The material includes high-quartz mixed crystals as the predominant crystalline phase, and a thermal expansion between room temperature and 700° C. from 1.0 to $2.5 \cdot 10^{-6}$/K.

21 Claims, No Drawings

TRANSPARENT OR TRANSPARENT COLORED LITHIUM ALUMINUM SILICATE GLASS CERAMIC ARTICLES HAVING ADAPTED THERMAL EXPANSION AND USE THEREOF

The invention relates to a transparent or transparent colored lithium aluminum silicate (LAS) glass-ceramic material having an adaptable thermal expansion and consisting of a glass-ceramic comprising high/β-quartz solid solution as predominant crystal phase and also to the use thereof.

It is generally known that glasses in the system $Li_2O$—$Al_2O_3$—$SiO_2$ can be converted into glass-ceramic articles having β-quartz solid solution and/or keatite solid solution as main crystal phases.

A key property of these glass-ceramic articles having β-quartz solid solution as main crystal phase is the ability to produce materials which have an extremely low coefficient of thermal expansion in a prescribed temperature range. In general, the thermal expansion behavior is set so that the materials have zero thermal expansion, usually $0\pm0.3\cdot10^{-6}/K$ in the region of their use temperatures. Thus, for example, the thermal expansion is minimized in the region of room temperature in use as substrate material, wafer stages or mirror supports for telescopes. For uses as transparent chimney sight window or dark colored cooking surface, the zero thermal expansion is set to very low values in a temperature range from room temperature to about 700° C.

Owing to the low thermal expansion at their use temperatures, these glass-ceramics have excellent temperature difference resistance and temperature change resistance and also dimensional stability.

In transparent form, e.g. as sight window for chimneys, for fire protection glazing, as cooking surface having a colored underside coating and for display applications, a high transparency, preferably a light transmission (brightness Y) in the visible range of greater than 80%, and a defined, usually neutral shade of color are generally desired.

The intrinsic color of transparent glass-ceramic articles has various causes. The color-imparting element Fe is present as impurity in the raw materials for the mix for melting. The use of the refining agents $Sb_2O_3$ and $CeO_2$ also leads to a slight intrinsic color. The described brownish yellow intrinsic color of the transparent glass-ceramic articles is based mainly on electronic transitions in color complexes which absorb in the short-wavelength region of visible light and in which the component $TiO_2$, which is active in nucleation, participates. The most frequent absorbing color complex is the formation of adjacent Fe and Ti ions between which electronic charge transfer transitions take place. Sn/Ti complexes likewise cause an intrinsic color. The Fe/Ti color complexes lead to a reddish brown discoloration, and the Sn/Ti color complexes lead to a yellowish brown discoloration. The formation of these color complexes takes place as early as during cooling of the starting glass and in particular during later ceramicization of the glass-ceramic articles. The intrinsic color can be reduced at the cost of a decreased light transmission by addition of color-imparting components such as $Nd_2O_3$ and CoO which absorb in the relatively long-wavelength red region of the spectrum. This optical overcoloration is disclosed in EP1837312 A1.

For use as cooking surface, a dark color of the intrinsically transparent glass-ceramic articles with a reduction of the light transmission to values below 5% is desirable so as to prevent the technical structures under the cooking surface from being seen through the glass-ceramic. On the other hand, the radiative heating bodies even at low power and colored displays underneath the cooking surface should be readily recognizable. Here, it is advantageous for not only the conventional red LED displays but also displays having blue, green, yellow, orange, white colors or even the color-faithful displays of colored VDUs to be possible.

The industrial production of these glass-ceramic articles is carried out in a plurality of stages and steps. Firstly, the crystallizable starting glass is melted from a mixture of broken glass and pulverulent raw materials of the mix at temperatures which are usually in the range from 1500 to 1650° C. Arsenic oxide and/or antimony oxide are/is typically used as refining agent in the melt. These refining agents are compatible with the required glass-ceramic properties and lead to good bubble qualities of the melt. Even when these materials have been completely melted into the glass structure they are still disadvantageous from safety and environmental protection points of view. Thus, particular precautions have to be taken in raw materials procurement, raw materials preparation and because of vaporization from the melt. Recently, the use of, in particular, $SnO_2$ as unproblematical refining agent has been described. To achieve good bubble qualities, halide compounds are preferably used as additional refining agent in addition to $SnO_2$ at conventional melting temperatures up to a maximum of 1700° C. Thus, the Japanese applications JP 11 100 229 A and JP 11 100 230 A describe the use of 0.1-2% by weight of $SnO_2$ and 0-1% by weight of Cl. The addition of 0.05-1% by weight of F (US 2007/0004578 A1) and 0.01-1% by weight of Br (US 2008/0026927 A1) has likewise been disclosed.

The use of $SnO_2$ in connection with high-temperature refining above 1700° C. to achieve good bubble qualities is described in DE 199 39 787 C2.

After melting and refining the glass is usually subjected to hot shaping by rolling or more recently by floating in order to produce plates. A low melt temperature and a low processing temperature $P_T$ are desirable for economical production. Furthermore, the glass must not display devitrification during shaping. This means that interfering crystals which in the starting glasses and the glass-ceramic articles produced therefrom impair the strength must not be formed during shaping. Since shaping takes place in the vicinity of the processing temperature $P_T$ (viscosity $10^4$ dPas) of the glass, it has to be ensured that the upper devitrification temperature of the melt is below the processing temperature in order to avoid the formation of interfering crystals.

In a subsequent thermal processing step, the starting glass is converted by controlled crystallization into the glass-ceramic article. This ceramicization is carried out in a two-stage thermal processing in which nuclei, usually composed of $ZrO_2/TiO_2$ mixed crystals, are firstly produced by nucleation at a temperature in the range from 680 to 800° C. $SnO_2$ can also participate in nucleation. When the temperature is subsequently increased, the β-quartz solid solution grow up on these nuclei. High crystal growth rates as are desirable for economically fast ceramicization are achieved at temperatures of from 800 to 950° C. At this maximum production temperature, the microstructure of the glass-ceramic is homogenized and the optical, physical and chemical properties are set. If desired, the β-quartz solid solution can subsequently be converted into keatite crystals. The transformation into keatite crystals is carried out by increasing the temperature to a temperature range from about 970 to 1250° C. This transformation increases the coefficient of thermal expansion of the glass-ceramic articles. In the case of glass-ceramic articles having keatite mixed crystals as main crystal phase, as, for example, in EP 1 170 264 B1, great efforts have been made to reduce the coefficients of thermal expansion to the lowest possible values which can be achieved in this crystal system of about $1 \cdot 10^{-6}$/K in order to make use as cooking surface with radiative heating possible. For this type of heating, a temperature difference resistance of >650° C. is required.

The transformation is also associated with crystal growth to average crystallite sizes of 100 nm and above and also associated light scattering. Glass-ceramic articles having keatite crystals as main crystal phase are therefore no longer transparent but translucent or opaque. When the glass-ceramic article is used as cooking surface, the light scattering has an adverse effect on the display capability since the displays under the glass-ceramic plate are no longer clearly discernible and undesirable halation occurs.

The temperature difference resistance of a glass-ceramic is given by the following relationship:

$$\Delta T = \frac{1}{f} \cdot \frac{\sigma_g \cdot (1-\mu)}{\alpha \cdot E}$$

Here, $\Delta T$ corresponds to the temperature difference resistance, f is a dimensionless correction factor (owing to the plate geometry and the temperature distribution), $\mu$ Poisson's number, E is the E modulus, $\alpha$ is the coefficient of thermal expansion and $\sigma_g$ is the strength for which it is necessary to use the value which is established in practical use due to surface damage.

Glass-ceramic articles having β-quartz solid solution as main crystal phase have hitherto been developed so as to have a very low or zero thermal expansion in their sphere of use. Current specifications are about $0 \pm 0.15 \cdot 10^{-6}$/K for cooking surfaces and about $0 \pm 0.3 \cdot 10^{-6}$/K for chimney windows (see tables 3.3 and 3.4 in the book "Low Thermal Expansion Glass-ceramics", second edition, editor Hans Bach, Dieter Krause, Springer-Verlag Berlin Heidelberg 2005, ISBN 3-540-24111-6). This is due to the fact that these values make it possible to achieve a high temperature difference resistance of the glass-ceramic articles in use since no thermally induced stresses arise in the event of temperature changes and adjacent regions having different temperatures build up no or only very low stresses. This is necessary, in particular, for cooking surfaces having radiative heating systems.

However, the low thermal expansion is also associated with technical disadvantages. The low thermal expansion is a peculiarity for materials. Joins to other materials, e.g. metals, ceramics, glasses, are virtually impossible or require complicated constructions using transition materials because of the high differences in the thermal expansion. The metallic or inorganic joint solders themselves posses a thermal expansion which is too high. The different coefficients of thermal expansion lead to high stresses which destroy the join, usually on cooling, or induce such high stresses that the strength is adversely affected.

In the case of joins which are mechanically pressed from the outside, a temperature change leads to continual working of the materials against one another, which can lead to loosening and crack formation, e.g. in the case of glass-ceramic articles having metallic frames.

In the case of transparent glass-ceramic articles such as chimney sight windows or in the case of transparent colored glass-ceramics such as cooking surfaces, decoration with inorganic colors is usual. Such decor colors are described, for example, in DE 197 21 737 C1. Depending on the composition, these decor colors, which consist of an inorganic glass flux and color-imparting pigments, have coefficients of thermal expansion in the range from room temperature to 300° C. from about 4 to $10 \cdot 10^{-6}$/K. Decoration is possible only within limits because of these different coefficients of thermal expansion. In particular, the layer thickness is limited to values of not more than about 3-5 μm if minimum values for the bending tensile strength of the decorated glass-ceramics above about 30 MPa are to be achieved. At higher layer thicknesses, a strength-reducing network of cracks is formed due to the high stresses generated in the decor layer. The adhesion of the decor layers is reduced and there is a risk of spalling, which is usually also accompanied by part of the glass-ceramic substrate also splitting off.

The large difference in the coefficients of thermal expansion leads to decorated glass-ceramic articles having a reduced bending tensile strength. The impact resistance is also reduced when the mechanical tensile stress acting from the outside acts on the decorated side of the glass-ceramic. Undecorated glass-ceramics, on the other hand, have bending tensile strength values of about 130 MPa.

Higher values of the bending tensile strength can be achieved in the case of decorated glass-ceramics when they have keatite crystals as main crystal phase and thus higher coefficients of thermal expansion of from about 1 to $2 \cdot 10^{-6}$/K. DE 197 21 737 C1 shows, in the examples, a comparison between substrates which are coated with the same decor colors and have been converted into glass-ceramic articles having β-quartz solid solution and keatite crystals, respectively, as main crystal phase. The bending tensile strengths of the decorated keatite glass-ceramic articles are higher by a factor of about 2. However, glass-ceramic articles having keatite mixed crystals as main crystal phase have the disadvantages described. In the case of transparent colored glass-ceramic articles as are used for cooking surfaces, the display capability for colored luminous displays is unsatisfactory. In the case of transparent glass-ceramics as are used for chimney windows, glass-ceramics having keatite crystals as main crystal phase are unsuitable because of strong scattering on the comparatively large crystallites and accordingly a lack of transparency.

In the case of glass-ceramic articles having β-quartz solid solution as main crystal phase and a low thermal expansion, the usable thicknesses of the decor layer are limited for strength reasons. The limited layer thicknesses then restrict the covering power of the color and thus the design opportunities.

In the case of transparent glass-ceramic articles, it is virtually impossible to produce decor coatings which cannot be seen through. Decoration seems generally transparent because of a lack of covering power.

Cooking surfaces made of colored glass-ceramics appear black. The limited layer thickness of the decor colors leads, particularly in the case of light decor colors, to a change in the color shade because the black substrate is not completely covered. In general, color intensity and the color region which can be achieved in the design are limited thereby.

Since decor colors having zero thermal expansion appear to be impossible to realize, it is in this respect desirable to increase the coefficient of thermal expansion of the glass-ceramic articles.

New developments in the field of chimney sight windows and also in heating systems for cooking surfaces have led to lower demands on the glass-ceramic materials in respect of the temperature difference resistance.

In the case of chimney sight windows installed in modern ovens, the demands on the temperature difference resistance decrease. Thus, to avoid deposition of soot on the window, a curtain of cold air is generated in the combustion space in front of the inside of the transparent glass-ceramic window. The temperatures to which the glass-ceramic window is subjected decrease as a result.

In the case of inductively heated cooking surfaces having electronic regulation, the required temperature difference resistance decreases to values of <600° C. and in the case of modern systems sometimes to values of <400° C. This is due to the principle of induction heating which does not heat the glass-ceramic plate itself but instead directly heats the metallic bottom of the pot. The glass-ceramic cooking surface is only indirectly heated by reverse heat transfer. Both black-colored glass-ceramic articles and transparent glass-ceramic articles having a non-see-through colored underside coating are used as cooking surfaces having inductive heating. Such transparent glass-ceramics with a colored underside coating and separately coated regions are known, for example, from the document U.S. Pat. No. 6,660,980 B2. Colored displays are made possible by configuration of the underside coating.

In the case of gas-heated cooking surfaces, too, less demanding requirements in respect of the temperature difference resistance are generally applicable.

In the case of more recent applications of transparent glass-ceramic panes as display glasses, in glazing for fire protection and in safety glazing in architecture or for ballistics protection, a relatively high coefficient of thermal expansion is advantageous for better matching to other materials. Thus, the glass-ceramic panes are, for example, installed in metal frames or bonded by means of polymers to form a laminate.

As a result of the less demanding requirements in terms of the temperature difference resistance, it is permissible to increase the coefficient of thermal expansion of the glass-ceramic articles. For some recent applications of transparent glass-ceramics, a relatively high thermal expansion is advantageous.

It is an object of the invention to exploit the less demanding requirements in terms of temperature difference resistance associated with modern glass-ceramic applications in order to make use of the advantages in respect of improved matching and adapting of the thermal expansion of the glass-ceramic articles to other materials and to decor colors.

Owing to their composition, the glass-ceramic articles should be suitable for economical and environmentally friendly production. To achieve economical production, the starting glasses should be readily meltable and refinable, have a high denitrification stability and be able to be ceramicized in short times.

When used as chimney window or cooking surface, the glass-ceramic articles should satisfy all requirements, e.g. chemical resistance, mechanical strength, transmission, heat resistance and long-term stability in respect of changes to its properties (e.g. thermal expansion, transmission, buildup of stresses). In respect of the transmission, a high light transmission and low intrinsic color are advantageous for transparent glass-ceramic articles. In the case of transparent colored glass-ceramic articles as are mainly used for cooking surfaces, a black appearance and good display capability with variously colored displays are desirable.

These objects are achieved by a lithium aluminum silicate glass-ceramic article as claimed in claim 1 and by its use as claimed in claim 11.

The transparent or transparent colored lithium aluminum silicate glass-ceramic articles have an adaptable and matched thermal expansion in the range from room temperature to 700° C. of from 1.0 to $2.5 \cdot 10^{-6}$/K and preferably from 1.3 to $1.8 \cdot 10^{-6}$/K and consists of β-quartz solid solution as predominant crystal phase.

The glass-ceramic articles of the invention contain the following components as main constituents:
$Li_2O$ 2.0-<3.0
MgO 1.4-3
$Al_2O_3$ 19-23
$SiO_2$ 60-69
$TiO_2$ 0.5-6.0
$ZrO_2$ 0-<2.0
$SnO_2$ 0-0.6.

The oxides $Li_2O$, MgO, $Al_2O_3$ and $SiO_2$ within the preferred limits indicated are constituents of the β-quartz solid solution. In the formation of the solid solution, the Li atoms and the Mg atoms together with the Al atom replace the Si atoms. The Al atom is incorporated in the position of the Si atom in the crystal lattice and the Li and Mg atoms in the channels of the crystal structure serve to balance the charge. A minimum $Li_2O$ content of 2% by weight is advantageous for readily controllable crystallization. Higher contents of 3% by weight and above make it difficult to set the values according to the invention for the thermal expansion since $Li_2O$ lowers these. An MgO content of from 1.4 to 3% by weight is necessary to set these. Since MgO leads to an increase in the thermal expansion of the β-quartz solid solution and thus the glass-ceramic, comparatively high contents compared to the usual contents are necessary.

To avoid relatively high viscosities of the starting glass and the undesirable devitrification of mullite during shaping, the $Al_2O_3$ content is preferably limited to a maximum of 23% by weight. The $SiO_2$ content should be not more than 69% by weight because this component greatly increases the viscosity of the glass. To achieve good melting of the glasses and low shaping temperatures, higher contents of $SiO_2$ are uneconomical. The minimum content of $SiO_2$ should be 60% by weight because this is advantageous for the required properties, e.g. chemical resistance and heat resistance.

$TiO_2$, $ZrO_2$ and $SnO_2$ are necessary as nucleating agents and during nucleation form solid solution composed of the three components. The β-quartz solid solution then grow on these crystal nuclei during crystallization.

The $ZrO_2$ content is limited to less than 2% by weight since higher contents cause a deterioration in the melting properties of the mix during glass production and the devitrification stability during shaping can be adversely affected by formation of $ZrO_2$-containing crystals. The component $TiO_2$ is a very effective component which is important for short nucleation times. The $TiO_2$ content should be at least 0.5% by weight and not more than 6% by weight. The content should not exceed 6% by weight because otherwise the devitrification stability is impaired. This also applies particularly to the component $SnO_2$ which is limited to values of not more than 0.6% by weight. Higher contents lead to crystallization of Sn-containing crystal phases at the contact materials (e.g. Pt/Rh) during shaping and are to be avoided.

The coefficient of thermal expansion should be at least $1.0 \cdot 10^{-6}$/K in order to improve the advantages in the matching of the thermal expansions of other materials and in particular decor colors. The coefficient of thermal expansion is not more than $2.5 \cdot 10^{-6}$/K because otherwise the associated temperature difference resistance decreases to unacceptably low values. Glasses which can be produced industrially, e.g. borosilicate glasses, are also available for such high coefficients of thermal expansion.

The coefficient of thermal expansion is preferably from 1.3 to $1.8 \cdot 10^{-6}$/K. These values also serve for other applications which are relatively demanding in respect of the temperature difference resistance, e.g. induction cooking surfaces with fast heating-up times (booster function) and chimney sight windows which have a relatively simple construction and in which the glass-ceramic panes are subjected to relatively high temperatures.

The setting of the coefficient of thermal expansion depends on two requirements. Firstly, the expansion coefficients will be set as high as possible in the range according to the invention in order to improve the thermal matching to other materials, in particular to decor colors. On the other hand, the magnitude of the coefficient of thermal expansion is limited by the temperature difference resistance associated with the desired use. The desired uses, in particular chimney sight windows and cooking surfaces having gas or induction heating generally require, depending on the technical design, values of the temperature difference resistance in the range from 250 to 600° C.

The value of the coefficient of thermal expansion which can be adjusted within the range according to the invention for the respective requirement achieves significantly improved matching to other materials and to decor colors. The increased coefficient of thermal expansion makes joining to other materials, e.g. plastics, metals, ceramics and glasses, easier, compared to glass-ceramics having zero thermal expansion. The use of metallic and inorganic bonding solders leads to lower stresses and the assembled joins thus have greater strength values. In the case of mechanically pressed joins, e.g. in the case of glass-ceramics having metallic frames, the materials work against one another to a lesser extent in the case of temperature changes, i.e. there is less movement and thus loosening and crack formation in the frame.

In the case of coating of the glass-ceramic articles with inorganic decor colors, the difference in the coefficients of thermal expansion is decreased. This makes it possible to achieve higher strengths of the decorated glass-ceramic article at the present customary layer thicknesses of from about 2 to 5 μm. The stresses built up during cooling after baking of the decor colors are reduced. The network of cracks usually formed is reduced thereby. This means that the cracks formed during relief of the stress do not extend as deeply into the glass-ceramic and the distances between the cracks in the decorated surfaces are increased. The usual crack depths can otherwise be about 30 μm, with the cracks penetrating into the glass-ceramic substrate. It is even possible for the formation of cracks to be generally avoided. Owing to the improved thermal matching, the adhesion of the decor layers is also improved, both after baking of the decor and in use under normal mechanical loads and recurring changes in temperature. Apart from the improvement in the strength, the improved thermal matching of the decor colors to the glass-ceramic substrate can also be exploited in order to increase the color covering power by means of increased layer thicknesses. In the case of transparent glass-ceramic articles, it is possible to produce decor coatings having improved visual opacity (lower transmission). In the case of cooking surfaces made of colored glass-ceramics having a black appearance, it is possible to achieve significantly more intense color shades by means of the greater layer thickness. In the case of lighter decor colors, the visual falsification of the color shade is avoided by the incompletely covered black glass-ceramic substrate. The color range available in the design is thus extended to lighter ranges and purer color shades. Measured in remission, this is expressed in greater L values in the CIELAB color system. The matched value of the thermal expansion thus makes it possible to broaden the design possibilities.

The glass-ceramic articles consists of β-quartz solid solution as predominant crystal phase. Other secondary crystal phases are, for example, the crystals of the nucleating agents $TiO_2$, $ZrO_2$ and $SnO_2$ formed during nucleation and also crystals of the keatite crystal type. The proportion of the secondary crystal phases should preferably be less than 10% by weight. Otherwise, the high refractive index of the nucleating agent crystals or the larger crystallite size of the keatite crystals leads to undesirable light scattering by the glass-ceramic. In the case of keatite mixed crystals, the average crystallite size is generally at least 100 nm. The associated light scattering becomes very undesirably noticeable as white streaks in transparent glass-ceramics. In the case of transparent colored glass-ceramics, e.g. in the case of cooking surfaces, the light scattering has an adverse effect on the visibility of displays. Illuminated displays under the glass-ceramic articles no longer give a sharp image and are accompanied by an undesirable halo effect.

It is therefore advantageous for the average crystallite size of the glass-ceramic articles having β-quartz solid solution as predominant crystal phase to be less than 150 nm and particularly preferably less than 70 nm.

The proportion of the β-quartz solid solution phase in the glass-ceramic article of the invention is preferably 50-75% by weight. The proportion of this crystal phase should be at least 50% by weight because this is advantageous for relatively high bending tensile strengths of the glass-ceramic articles. The proportion of the crystal phase is preferably less than 75% by weight. In the case of higher values, it is difficult to ceramicize the crystallizable glasses in short times without distortion. Owing to the relatively high values of the heat of crystallization generated nonuniformly over the volume during crystallization of the glass-ceramic articles and the greater stiffness of the glass-ceramic articles, relatively long times are required to obtain deformation-free glass-ceramic articles, for example flat plates.

The glass-ceramic of the invention preferably contains, as main constituents of the composition, the components (in % by weight on an oxide basis):

$Li_2O$ 2.0-<3.0
$\Sigma Na_2O+K_2O$ 0-2
$MgO$ 1.4-3
$\Sigma CaO+SrO+BaO$ 0-4
$ZnO$ 0-3
$Al_2O_3$ 19-23
$SiO_2$ 60-69
$TiO_2$ 0.5-6.0
$ZrO_2$ 0-<2.0
$SnO_2$ 0-0.6
$\Sigma TiO_2+ZrO_2+SnO_2$ 3-6
$P_2O_5$ 0-3 with the condition that (in % by weight):
$MgO/Li_2O>0.4$,
and optionally a refining agent selected from the group consisting of $Sb_2O_3$, $As_2O_3$ in amounts of from 0.1 to 2% by weight.

In the production of glass-ceramic articles, good bubble qualities having bubble counts of less than 5, preferably less than 3, bubbles/kg in the crystallizable starting glass or in the glass-ceramic (based on bubble sizes above 0.1 mm) are required.

To improve refining, further refining agents such as $CeO_2$, sulfate, sulfide and halogen compounds can be used in addition to the abovementioned main refining agents. The contents of these further refining agents are usually limited to amounts of up to 1% by weight.

For the setting according to the invention of the thermal expansion of the glass-ceramic articles, the MgO content is at least 40%, preferably at least 50%, of the $Li_2O$ content, i.e. the relationship $MgO/Li_2O \geq 0.4$, preferably $\geq 0.5$, applies.

The minimum amount of the nucleating agents $TiO_2$, $ZrO_2$ and $SnO_2$ is 3% by weight. During ceramicization, they form, during nucleation, crystal nuclei which serve as substrate for growth of the β-quartz solid solution during crystallization. The high quantity of nuclei leads to a high crystal quantity and ensures an average crystallite size which remains below 150 nm; exceeding this is critical in respect of undesirable light scattering. In addition, the nucleating agent contents correlate with the nucleation rate and are thus important for relatively short ceramicization times. Total contents greater than 6% by weight impair the devitrification stability. To achieve an improved devitrification stability, the $SnO_2$ content is limited to 0.6 and preferably to 0.4% by weight.

ZnO and $P_2O_5$ can be incorporated as further components into the β-quartz solid solution. The ZnO content is, owing to the problems of formation of undesirable crystal phases such as zinc spinel (gahnite), limited to values of not more than 3% by weight during ceramicization. The addition of $P_2O_5$ can be up to 3% by weight and is preferably limited to 1.5% by weight. The addition of $P_2O_5$ is advantageous for the devitrification stability, but higher contents have an adverse effect on the acid resistance of the glass-ceramic articles.

The addition of the alkalis $Na_2O$, $K_2O$ and the alkaline earths CaO, SrO, BaO and of $B_2O_3$ improve the meltability and the devitrification behavior during shaping of the glass. However, the contents have to be limited because these components are not incorporated into the crystal phases but instead remain essentially in the residual glass phase of the glass-ceramic article. Excessively high contents impair the crystallization behavior in the conversion of the crystallizable starting glass into the glass-ceramic, in particular at the expense of rapid ceramicization rates. In addition, relatively high contents have an adverse effect on the time/temperature stability of the glass-ceramic article.

The sum of the alkalis $Na_2O+K_2O$ is not more than 2% by weight and preferably not more than 1.5% by weight.

The sum of the alkaline earths CaO+SrO+BaO should be not more than 4% by weight.

The above mentioned alkalis and alkaline earths accumulate not only in the residual glass phase between the crystals but also on the surface of the glass-ceramic article. During ceramicization, a vitreous surface layer which has a thickness of from about 200 to 1500 nm and is virtually free of crystals is formed and this is enriched in these elements and depleted in lithium. This vitreous surface layer has a favorable effect on the chemical resistance of the glass-ceramic articles.

The water content of the starting glasses for producing the cooking surfaces according to the invention is, depending on the choice of mixed raw materials and the process conditions during melting, usually in the range from 0.015 to 0.06 mol/l. This corresponds to β-OH values of from 0.16 to 0.64 $mm^{-1}$ for the crystallizable starting glasses.

The glass-ceramic articles of the invention preferably have a composition without the refining agent arsenic oxide and/or antimony oxide and are therefore technically free of these components which are disadvantageous from safety and environmental points of view. As impurities, these components are usually present in amounts of less than 0.05% by weight.

The inventive transparent lithium aluminum silicate glass-ceramic or the articles produced therefrom preferably has/have a composition of the glass-ceramic which, in percent by weight of an oxide basis, consists essentially of:

$Li_2O$ 2.0-<3.0
$\Sigma Na_2O+K_2O$ 0.1-1.5
MgO 1.4-2.6
$\Sigma CaO+SrO+BaO$ 0-4
ZnO 0-3
$B_2O_3$ 0-2
$Al_2O_3$ 19-23
$SiO_2$ 60-69
$TiO_2$ 0.5-2.5
$ZrO_2$ 0-<2
$P_2O_5$ 0-3
$SnO_2$ 0-0.6
$\Sigma TiO_2+ZrO_2+SnO_2$ 3-6
$Nd_2O_3$ 0-0.4
$Fe_2O_3$ <0.03
with the condition that:
$MgO/Li_2O>0.5$
and optionally a refining agent selected from the group consisting of $Sb_2O_3$, $As_2O_3$ in amounts of from 0.1 to 2% by weight.

The expression "consists essentially of" means that the specified components should make up at least 96%, generally 98%, of the total composition. Many elements such as F, Cl, the alkalis Rb, Cs or elements such as Hf are usual impurities in the mixed raw materials used industrially. Other compounds such as those of the elements Ge, rare earths, Bi can be added in small proportions.

Favorable properties in respect of transmission and also meltability and devitrification stability are achieved in these composition ranges. To obtain improved meltability and devitrification stability, the content of the alkalis $Na_2O+K_2O$ should preferably be at least 0.1% by weight.

To obtain improved devitrification stability, the $SnO_2$ content is limited to 0.6 and preferably 0.4% by weight.

In the case of chimney sight windows, a good view through to the combustion space and the flame is desirable. In the case of cooking surfaces having a colored underside coating, the color of the underside coating should not be falsified by the intrinsic color or a gray cast of the glass-ceramic.

A high light transmission (brightness) Y of at least 80%, preferably greater than 85%, measured at a thickness of 4 mm using standard light C, 2° is therefore required for the uses of the transparent glass-ceramic articles. The terms light-transmission and brightness Y correspond to the same parameters measured in accordance with DIN 5033.

In a preferred embodiment of the invention, both a high light transmission and only a slight intrinsic color are provided. The transparent glass-ceramic then has a yellowness index (measured in accordance with the standard ASTM 1925/70 (77, 85)) of less than 12, at a thickness of 4 mm.

This combination of high light transmission and weak intrinsic color is possible with the low $Fe_2O_3$ contents matched to one another according to the invention of <0.03% by weight, with the defined contents of nucleating agents $TiO_2$, $SnO_2$ and $ZrO_2$ and by means of the $MgO/Li_2O$ ratio.

The intrinsic color is critically determined by the color complexes described, in which the component necessary for nucleation, the Ti ion, participates.

To reduce the intrinsic color, the contents of $Fe_2O_3$ are limited to less than 0.03% by weight and those of $TiO_2$ are limited to not more than 2.5% by weight.

The ratio of the oxides $MgO/Li_2O$ is at least 0.5. It has been found that despite the high MgO contents at the low $Li_2O$ contents, the intrinsic color of the transparent glass-ceramic articles is not impaired as usual by the high MgO contents. This adverse effect of the relatively high MgO contents is described, for example, in the U.S. Pat. No. 4,438,210. The reason for this surprising observation is considered to be that relatively large amounts of Mg are incorporated into the high-quartz crystals because of the low $Li_2O$ contents and there replace Li. It is assumed that the component MgO has an adverse effect on the intrinsic color of transparent glass-ceramic articles only when it remains in the residual glass phase.

The optional addition of the overcoloring agent $Nd_2O_3$ in contents of up to 0.4% by weight enables the intrinsic color to be reduced, but this does reduce the light transmission. Further color-imparting components such as CoO can be added in amounts of up to about 100 ppm to adjust the color position.

In the form as transparent colored lithium aluminum silicate glass-ceramic or articles produced therefrom, this/these preferably has/have a light transmission of less than 5% and a composition of the glass-ceramic which, in % by weight on an oxide basis, consists essentially of:

$Li_2O$ 2.0-<3.0
$\Sigma Na_2O+K_2O$ 0.1-1.5
MgO 1.4-2.6
$\Sigma CaO+SrO+BaO$ 0-4
ZnO 0-3
$B_2O_3$ 0-2
$Al_2O_3$ 19-23
$SiO_2$ 60-69
$TiO_2$ 2-6
$ZrO_2$ 0-<2
$P_2O_5$ 0-3
$SnO_2$ 0-0.6
$\Sigma TiO_2+ZrO_2+SnO_2$ 3-6
$V_2O_5$ 0.01-0.06
with the condition that:
$MgO/Li_2O>0.5$
and optionally a refining agent selected from the group consisting of $Sb_2O_2$, $As_2O_3$ in amounts of from 0.1 to 2% by weight.

To set the light transmission according to the invention of less than 5%, measured using standard light C, 2°, matched to the respective thickness of the glass-ceramic article, the glass-ceramic contains 0.01-0.06% by weight of $V_2O_5$ as colorant. The relatively high $TiO_2$ contents of at least 2% by weight aid the coloring effect of the $V_2O_5$. The composition contains, as further coloring oxide, $Fe_2O_3$ in amounts which exceed the usual contamination in industrial mixed raw materials of about 0.03% by weight and can be up to 0.3% by weight. At relatively high contents, the ability to decorate with light colors is impaired, since these discolor.

In this preferred composition range according to the invention, too, the condition $MgO/Li_2O>0.5$ should apply. This ensures that the desired values according to the invention for thermal expansion are achieved.

As main refining agent, at least one refining agent is selected from the group consisting of $SnO_2$, $Sb_2O_3$ and $As_2O_3$, in contents of from 0.1 to 2% by weight. To achieve environmentally friendly refining, preference is given to using less than 0.6% by weight of $SnO_2$ and the composition being technically free of $Sb_2O_3$ or $As_2O_3$. To obtain improved devitrification stability, the $SnO_2$ content is preferably limited to 0.4% by weight.

To achieve economical production, the crystallizable starting glass should be readily meltable and have a high devitrification stability. The processing temperature should be less than 1320° C. and preferably less than 1310° C. The upper devitrification limit should be at least 15° C. below and preferably at least 30° C. below the processing temperature. Crystal phases which are critical in respect of devitrification are mullite (aluminum silicate), baddeleyite ($ZrO_2$) and $SnO_2$-containing crystal phases. Relatively high contents of $Li_2O$, $Al_2O_3$, $SiO_2$, $ZrO_2$ and $SnO_2$ are accordingly disadvantageous in respect of the devitrification stability. To reduce the viscosity of the glass melt, it has been found to be necessary to reduce the content of $SiO_2$, $Al_2O_3$, $ZrO_2$, while the contents of alkalis $Na_2O+K_2O$ and alkaline earths $CaO+SrO+BaO$ can be chosen as relatively high values.

The transparent colored lithium aluminum silicate glass-ceramic article preferably has a light transmission of less than 5% and a composition in % by weight of an oxide basis of:

$Li_2O$ 2.0-<3.0
$Na_2O$ 0.1-1
$K_2O$ 0.1-1
$\Sigma Na_2O+K_2O$ 0.2-1.5
MgO 1.5-2.6
CaO 0.1-1
SrO 0-1
BaO 0-3
$\Sigma CaO+SrO+BaO$ 0.2-4
ZnO 0-2.5
$B_2O_3$ 0-1
$Al_2O_3$ 19-23
$SiO_2$ 62-67
$TiO_2$ 2.5-6
$ZrO_2$ 0-1.6
$P_2O_5$ 0-1.5
$SnO_2$ 0.1-0.4
$\Sigma TiO_2+ZrO_2+SnO_2$ 4.2-6
$V_2O_5$ 0.01-0.05
$Fe_2O_3$ 0.05-0.3
with the conditions that:
$Fe_2O_3/V_2O_5>2$
$MgO/Li_2O>0.5$,
without the refining agents arsenic oxide and antimony oxide.

The condition $MgO/Li_2O>0.5$ ensures that the desired values according to the invention for the thermal expansion are achieved.

To set the light transmission of less than 5% measured using standard light C, 2°, matched to the thickness of the glass-ceramic or the article produced therefrom, a combination of the coloring oxides $V_2O_5$ and $Fe_2O_3$ is used. The amount of $Fe_2O_3$ should be at least twice that of $V_2O_5$. The component $Fe_2O_3$ is a cheap and environmentally friendly raw material. In addition, $Fe_2O_3$ aids refining of the glass melt. Amounts above 0.3% by weight are unfavorable for the ability to decorate using light colors since these discolor.

To achieve environmentally friendly refining conditions, preference is given to using from 0.1 to 0.4% by weight of $SnO_2$ and the composition being technically free of $Sb_2O_3$ or $As_2O_3$.

The preferred geometry for the transparent or transparently colored glass-ceramic or the articles produced therefrom is plate-like with thicknesses of from 2.5 to 14 mm because important applications, e.g. as chimney sight window, fire protection glazing, display panel, cooking surface and as safety glazing having a mechanical or ballistic protective action, are opened up for this shape. The strength is adversely affected at lower thicknesses, and higher thicknesses are less economical because of the higher materials requirement. Except for the use as safety glass, in the case of which high strengths are important, a thickness of less than 6 mm is therefore generally chosen.

Suitable shaping processes for the required plate-like geometry are rolling and floating.

The glass-ceramic plate can not only have a flat shape, but it is also possible to use three-dimensionally shaped plates, e.g. chamfered, angled or arched plates. The plates can have rectangular or other shapes and contain three-dimensionally shaped regions, e.g. woks, or rolled-in ridges, in addition to flat regions. The geometric shaping of the plates is, in the case of hot forming, e.g. by means of structured shaping rollers or by means of subsequent hot forming, carried out on the starting glasses, e.g. by means of burners, or by gravity deforming during ceramicization with supporting ceramic molds.

The transparent or transparently colored glass-ceramic plate is preferably coated over its entire area or part of its area with inorganic decoration.

Preference is given to using an inorganic decor color having a comparatively low thermal expansion. The decor color is selected so that the difference between its thermal expansion and that of the glass-ceramic plate, measured in the range from room temperature to 300° C., is less than $4 \cdot 10^{-6}/K$. This is aided by the relatively high expansion of the glass-ceramic according to the invention and leads to lower stresses between decor layer and substrate. To achieve environmentally friendly decoration using inorganic colors, preference is given to selecting a composition which is technically free of lead, cadmium, mercury, hexavalent chromium and compounds thereof.

Examples of decorations are the peripheral frame in the case of chimney windows made of transparent glass-ceramic plates. In the case of cooking surfaces, there are a variety of decorations for the purposes of design or of a technical type, e.g. for cooking zone markings.

The layer thickness of the decoration after baking is usually limited to 2-5 μm in order to achieve the minimum strengths of greater than 30 MPa for most requirements. In the case of the glass-ceramic articles according to the invention, higher bending tensile strengths than usual of greater than 50 MPa and even greater than 60 MPa can be achieved at the usual layer thicknesses of the decoration.

The usable thicknesses of the decor layer are increased by the higher thermal expansion according to the invention of the glass-ceramics having higher-β-quartz solid solution as main crystal phase. This applies particularly when the hitherto customary specifications for the bending tensile strength are retained. The thickness of the decoration is greater than 5 μm, preferably greater than 6 μm, with the minimum strength of 35 MPa being achieved. This makes decor layers having increased color covering power possible and widens the total design possibilities.

Cooking surfaces made of transparently colored glass-ceramic having a black appearance when viewed in reflected light can, owing to the higher layer thickness of the decor, be decorated with more intense shades of color. The decor colors are more true in color and are falsified to a lesser extent by the black substrate shining through. In general, the color range which can be employed in the design can be broadened as a result.

In the case of transparent glass-ceramic articles, the higher layer thickness makes it possible to produce decor coatings having improved visual opaqueness.

The transparent or transparently colored lithium aluminum silicate glass-ceramic plate is preferably configured as a cooking surface because the advantages of the adjustable matched thermal expansion in the decoration, as described, are particularly relevant here.

When the cooking surface consists of a transparent colored lithium aluminum silicate glass-ceramic plate, it should have a light transmission of from 0.5 to 2.5%. To prevent the undesirable view through to the technical components under the glass-ceramic cooking surface, the light transmission is limited to values below 2.5%. This limitation also ensures the desired black appearance when viewed in reflected light. On the other hand, a light transmission of at least 0.5% is necessary to enable the displays to be seen since the illuminated displays usually comprise light-emitting diodes installed underneath the cooking plate. These values are not dependent on the thickness of the glass-ceramic plate, which is usually from 2.5 to 6 mm. At lower thicknesses, the strength is impaired, and greater thicknesses are less economical because of the greater materials requirement.

In order to make displays having the usual red colors and other colored displays possible, the transmission in the region of visible light should be greater than 0.1% for the entire wavelength range from 450 nm upward. The transmission values of commercial glass-ceramic cooking surfaces at wavelengths below 550 nm are below this value of 0.1%. Conventional red light-emitting diodes emit at wavelengths of about 630 nm. However, due to the strong absorption in the region of visible light below 550 nm, resulting in a transmission of less than 0.1%, the display capability for displays of a different color is lost. This applies especially to displays having commercial blue and green light-emitting diodes.

When the cooking surface is produced by shaping using rollers, the underside is usually provided with knobs in order to protect it against strength-decreasing damage during production. The region of the colored displays is often smoothed by means of a transparent organic polymer in order to avoid optical distortion by the knobs. In the case of cooking surfaces having a smooth underside without knobs, colored displays are undistorted and appear brighter.

The transmission of the cooking surface is preferably set to values of:

>0.15% at 450 nm,
>0.15% at 500 nm,
>0.25% at 550 nm,
2-12% at 630 nm and the light transmission in the visible region is set to 0.7-2.5%.

At these values, the color display capability is further improved and the various requirements in terms of transmission are optimized further. Particularly good covering of the technical installations underneath the cooking surface glass-ceramic and a particularly esthetic black appearance in reflected light is achieved when the light transmission is less than 1.7%. Transmission values of the cooking surface at 630 nm of from 2 to 12% correspond to the tolerance values of commercial cooking surfaces. It is advantageous to set these customary values so that the appearance of the customary red LED displays remains unchanged even in the case of the cooking surface according to the invention.

Apart from the coloring oxide $V_2O_5$ in amounts of from 0.01 to 0.06% by weight, further color-imparting components such as compounds of chromium, manganese, cobalt, nickel, copper, selenium, rare earth metals and molybdenum or sulfide compounds can also be used in order to aid coloring. Thus, for example, the addition of CoO and NiO is useful for optimizing, especially, displays having blue LEDs. The content of the color-imparting additives is limited to amounts of not more than about 2% by weight, preferably less than 1% by weight, because these compounds generally reduce the transmission in the visible and infrared regions. In addition, these mostly polyvalent compounds interfere with the coloration by the $V_2O_5$ via redox reactions and make setting of the transmission values according to the invention difficult.

Addition of reducing agents in pulverulent and/or liquid form to the starting mix can increase the coloring effect of $V_2O_5$. Metals, carbon and/or oxidizable carbon or metal compounds such as Al or Si powder, sugar, wood charcoal, SiC, TiC, MgS, ZnS are suitable for this purpose. Gaseous reducing agents such as $H_2/N_2$ are also suitable.

Less than 0.03% by weight of $V_2O_5$ are then preferably required. Since vanadium oxide is an expensive raw material, it is economically advantageous to minimize the content thereof.

Instead of or in addition to the conventional red displays, one or more differently colored displays such as blue, green, yellow, orange or white displays are preferably arranged under the cooking surface of the invention having an improved color display capability. Owing to the transmission profile, blue or white displays are particularly preferred. The colored displays consist of light-emitting electronic components, usually light-emitting diodes. All shapes of displays, both points and areas, are possible. Owing to the uniform spectral profile of the transmission in the visible region, colored displays or VDUs can also be achieved for the first time.

The cooking surface is preferably heated by means of gas burners or inductively. The temperature difference resistance of the cooking area associated with the thermal expansion according to the invention is less than 600° C. This is sufficient for the types of heating mentioned and the advantages resulting from the matched thermal expansion are retained.

The present invention is illustrated by the following examples.

For some examples, compositions and properties of the crystallizable starting glasses for transparent glass-ceramics are shown in table 1. Here, glasses 1 to 3 are glasses according to the invention and glass 4 is a comparative glass which is outside the scope of the present invention. Table 2 shows compositions and properties of crystallizable starting glasses for transparent colored glass-ceramics. Here, glasses 5 to 11 are glasses according to the invention and glass 12 is a comparative glass which is outside the scope of the present invention. Owing to typical impurities in the industrial mix of raw materials used, the compositions do not add up to precisely 100% by weight. Typical impurities, even if not deliberately introduced into the composition, are F, Cl, B, P, Rb, Cs, Hf or Sr which are usually present in amounts of less than 0.05% by weight. They are often introduced via the raw materials for the related components, e.g. Rb and Cs via the Na and K raw materials, or Sr via the Ba raw material.

Tables 1 and 2 also show the properties in the vitreous state, e.g.: transformation temperature Tg, processing temperature $P_T$, devitrification temperature and also the density. To measure the devitrification temperature, the glasses are melted in Pt/Rh10 crucibles. The crucibles are subsequently maintained for 5 hours at various temperatures in the region of the processing temperature. The uppermost temperature at which the first crystals occur at the contact interface of the glass melt to the crucible wall determines the denitrification temperature.

The water content of the glasses is 0.03-0.05 mol/l, corresponding to $\beta_{OH}$ values of from 0.32 to 0.53 $mm^{-1}$.

The starting glasses in tables 1 and 2 were melted from raw materials customary in the glass industry at temperatures of about 1620° C. for 4 hours. After melting of the mix in crucibles made of sintered silica glass, the melts were poured into Pt/Rh crucibles with silica glass layers and homogenized by stirring for 30 minutes at temperatures of 1550° C. After this homogenization, the glasses were refined for 2 hours at 1640° C. Pieces having dimensions of about 140×140×30 $mm^3$ were subsequently cast and cooled to room temperature in a cooling furnace, commencing at 660° C. The castings were divided into the sizes required for the tests and for ceramicization.

Tables 3 and 4 show the ceramicization conditions and properties of the glass-ceramics obtained. The ceramicizations were carried out using the following temperature programs. Heating up to a temperature of 680° C. is carried out using the maximum heating rate possible in the ceramicization furnace, viz. about 20° C./min. The temperature range from 680 to 800° C. is important for nucleation. The increase in temperature in this range is matched to the respective composition so that light scattering due to excessively coarse crystallite is avoided. Crystallization of the desired β-quartz solid solution phase occurs at above 800° C. In the ceramicization programs 1 and 2, a hold time $t_N$ is inserted in the region of nucleation at the temperature $T_N$. Likewise, the maximum temperature $T_{max}$ and hold time $t_{max}$ are individually matched to the composition. The values are shown in the tables.

Ceramicization Program 1 a) rapid heating from room temperature to 680° C.,
b) increase in the temperature from 680° C. to the nucleation temperature $T_N$ at a heating rate of 5° C./min, hold time $t_N$ of 30 min at $T_N$, further heating at 2.5° C./min to 800° C.,
c) increase in temperature from 800° C. to the maximum temperature $T_{max}$ at a heating rate of 2.5° C./min, hold time $t_{max}$ of 15 minutes at $T_{max}$,
d) cooling to 600° C. at 4° C./min, then rapid cooling to room temperature.

Ceramicization Program 2 a) rapid heating from room temperature to 680° C.,
b) increase in temperature from 680° C. to the nucleation temperature $T_N$ at a heating rate of 10° C./min, hold time $t_N$ of 15 minutes at $T_N$, further heating at 10° C./min to 800° C.,
c) increase in temperature from 800° C. to the maximum temperature $T_{max}$ at a heating rate of 10° C./min, hold time $t_{max}$ of 15 min at $T_{max}$,
d) cooling to 800° C. at 10° C./min, then rapid cooling to room temperature.

Ceramicization Program 3 a) rapid heating from room temperature to 680° C.,
b) increase in temperature from 680° C. to 730° C. at a heating rate of 10° C./min, further heating at 5.2° C./min to 800° C.,
c) temperature increase from 800° C. to the maximum temperature $T_{max}$ of 920° C. at a heating rate of 6° C./min, hold time $t_{max}$ of 6 min at $T_{max}$,
d) cooling to 800° C. at 4° C./min, then rapid cooling to room temperature.

Ceramicization Program 4 a) rapid heating from room temperature to 680° C.
b) increase in temperature from 680° C. to 800° C. at a heating rate of 10° C./min
c) increase in temperature from 800° C. to the maximum temperature $T_{max}$ at a heating rate of 10° C./min, hold time $t_{max}$ of 15 minutes at $T_{max}$
d) cooling to 800° C. at 10° C./min, then rapid cooling to room temperature.

Examples 4 and 13 in tables 3 and 4 are comparative glass-ceramics which are outside the scope of the invention and were produced from the crystallizable comparative glasses 4 and 12 indicated. The thermal expansion in the range from 20 to 500° C. and in the range from 20 to 700° C. and the content of the main crystal phase consisting of β-quartz solid solution, measured by means of X-ray diffraction, and also the average crystallite size are shown.

The transmission measurements were carried out on polished plates having the indicated thickness using standard light C, 2°. In the measurements on the transparent and transparent colored glass-ceramic articles (table 3 and table 4), the transmission values at selected wavelengths and also the brightness Y or light transmission in accordance with DIN 5033 are reported.

The intrinsic color of the transparent glass-ceramic articles in table 3 is characterized by the yellowness index in accordance with standard ASTM 1925/70 (77, 85).

In the further examples 14 to 25 (table 5), plates having the dimensions 50×50×3 mm were prepared from the crystallizable starting glasses. The surfaces of the plates are polished.

The plates were decorated over their entire area in various layer thicknesses by means of screen printing. For comparative purposes, some plates remained undecorated. For screen printing, screen printing pastes were produced from inorganic powders in a known manner. For this purpose, a powder having an average particle size of about 2 µm was firstly produced from a low-melting glass having a composition corresponding to DE 19721737 C1. This was mixed with 20% of a white or black pigment and processed with addition of screen printing oil based on spruce oil to give a screen printing paste. Various layer thicknesses of the decoration were produced by varying the screen printing parameters. The baking of the printed decor test pattern was carried out in a laboratory furnace. Here, the ceramicization of the crystallizable starting glasses to give a glass-ceramic having β-quartz solid solution as main crystal phase was also carried out. Table 5 shows the baking and ceramicization program used and also the properties obtained as a function of the layer thickness.

The layer thickness was determined after baking by means of an Alphastep profilometer having a diamond tip from Tencor. The bending tensile strength was measured by the double-ring method (DIN EN1288-5).

In examples 15 to 17 and comparative examples 19 to 21, glasses which can be crystallized to form transparently black colored glass-ceramic articles are decorated. Examples 14 and 18 are the undecorated reference plates. The plates are prepared in the same way. Comparative examples 18 to 21 are produced from a further crystallizable comparative glass No. 13. The composition of this is disclosed in DE 10 2008 050 263 A1, table 1, glass No. 13, and leads to a glass-ceramic having a low thermal expansion of $-0.14 \cdot 10^{-6}$/K, outside the scope of the present invention.

The inorganic decoration contains a commercial $TiO_2$ white pigment as pigment. The color covering power and color intensity of the decorated regions were determined as a function of the layer thickness of the decor and in comparison with the undecorated reference by means of remission and measurement of the light transmission in transmitted light using standard light C/2°. The values are indicated in the Lab color system and the CIE color system. The advantageous effect of greater layer thicknesses can be seen from the values. In the comparative examples, the greater decrease in the bending tensile strengths of the decorated plates can be seen.

Depending on the layer thickness, the network of cracks formed was also evaluated according to frequency (distance between the cracks) and depth of the cracks by means of an optical microscope. Here, 5 means a very dense, deep network of cracks from which high stresses between decor layer and glass-ceramic substrate can be concluded and 0 means no cracks discernible under the microscope. The decorated comparative examples have a more severe network of cracks.

The covering power of the black-decorated transparent glass-ceramics, examples 23 to 25, was measured as a function of the layer thickness by measurement of the light transmission in transmitted light in the decorated region. For comparative purposes, both the bending tensile strength and the light transmission were determined on undecorated comparative specimens having the same thickness (example 22). The advantageous effect of greater layer thicknesses of the decor on the color covering power can be seen.

TABLE 1

Compositions and properties of starting glasses according to the invention and comparative glass 4 for transparent glass-ceramics

| Compositions in % by weight on | Glass No. | | | |
|---|---|---|---|---|
| an oxide basis | 1 | 2 | 3 | 4 |
| $Al_2O_3$ | 19.9 | 20.7 | 21.1 | 20.0 |
| $As_2O_3$ | 0.75 | — | — | 0.81 |
| BaO | 0.84 | 2.26 | — | 0.82 |
| CaO | — | 0.43 | 0.20 | — |
| $K_2O$ | 0.19 | 0.25 | 0.10 | 0.18 |
| $Li_2O$ | 2.79 | 2.87 | 2.66 | 3.71 |
| MgO | 2.24 | 1.56 | 2.40 | 1.04 |
| $Na_2O$ | 0.14 | 0.56 | 0.40 | 0.14 |
| $P_2O_5$ | 0.03 | — | 0.03 | 0.03 |
| $SiO_2$ | 67.3 | 65.1 | 67.2 | 67.5 |
| $SnO_2$ | — | 0.23 | 0.19 | — |
| SrO | | | | |
| $TiO_2$ | 2.41 | 3.14 | 2.19 | 2.38 |
| ZnO | 1.53 | 1.38 | 1.64 | 1.53 |
| $ZrO_2$ | 1.82 | 1.40 | 1.82 | 1.82 |
| $Nd_2O_3$ | — | — | 0.016 | — |

TABLE 1-continued

Compositions and properties of starting glasses according to the invention and comparative glass 4 for transparent glass-ceramics

| Compositions in % by weight on an oxide basis | | Glass No. | | | |
|---|---|---|---|---|---|
| | | 1 | 2 | 3 | 4 |
| $Fe_2O_3$ | | 0.017 | 0.090 | 0.012 | 0.016 |
| Ratio of $MgO/Li_2O$ | | 0.80 | 0.54 | 0.90 | 0.28 |
| Tg | °C. | 694 | 684 | 704 | 683 |
| $P_T$ | °C. | 1320 | 1309 | 1315 | 1325 |
| Density | g/cm³ | 2.464 | 2.490 | 2.457 | 2.449 |
| Devitrification temp | °C. | 1285 | 1260 | 1340 | 1300 |

TABLE 2

Compositions and properties of starting glasses according to the invention and comparative glass 12 for transparent colored glass-ceramics

| Compositions in % by weight on an oxide basis | | Glass No. | | | | | | | |
|---|---|---|---|---|---|---|---|---|---|
| | | 5 | 6 | 7 | 8 | 9 | 10 | 11 | 12 |
| $Al_2O_3$ | | 20.6 | 20.6 | 19.8 | 19.5 | 18.0 | 18.5 | 19.8 | 20.9 |
| BaO | | 2.20 | 2.20 | 2.02 | 2.28 | 1.42 | 1.45 | 1.94 | 2.28 |
| $B_2O_3$ | | — | — | — | — | 0.94 | — | — | — |
| CaO | | 0.43 | 0.43 | 0.67 | 0.66 | 3.02 | 2.04 | 0.70 | 0.42 |
| $K_2O$ | | 0.21 | 0.21 | 0.22 | 0.22 | 0.21 | 0.22 | 0.22 | 0.23 |
| $Li_2O$ | | 2.85 | 2.12 | 2.66 | 2.58 | 2.58 | 2.72 | 2.70 | 3.70 |
| MgO | | 1.57 | 2.44 | 1.75 | 1.60 | 1.63 | 1.65 | 1.74 | 0.37 |
| $Na_2O$ | | 0.55 | 0.54 | 0.50 | 0.59 | 0.53 | 0.56 | 0.49 | 0.59 |
| $P_2O_5$ | | 0.06 | — | 0.06 | 0.06 | — | — | 0.07 | 0.07 |
| $SiO_2$ | | 65.2 | 65.1 | 65.4 | 65.6 | 65.1 | 66.1 | 65.2 | 65.1 |
| $SnO_2$ | | 0.23 | 0.23 | 0.25 | 0.25 | 0.24 | 0.25 | 0.25 | 0.24 |
| $TiO_2$ | | 3.13 | 3.15 | 3.25 | 3.40 | 3.29 | 3.36 | 5.07 | 3.10 |
| ZnO | | 1.40 | 1.42 | 1.69 | 1.57 | 1.38 | 1.41 | 1.62 | 1.50 |
| $ZrO_2$ | | 1.39 | 1.39 | 1.55 | 1.51 | 1.44 | 1.51 | — | 1.36 |
| $Fe_2O_3$ | | 0.092 | 0.091 | 0.087 | 0.087 | 0.092 | 0.095 | 0.093 | 0.080 |
| CoO | | — | — | — | — | — | — | — | 0.003 |
| $MnO_2$ | | — | — | 0.020 | 0.020 | — | — | — | — |
| $V_2O_5$ | | 0.027 | 0.026 | 0.027 | 0.027 | 0.024 | 0.025 | 0.019 | 0.024 |
| Ratio of $MgO/Li_2O$ | | 0.55 | 1.15 | 0.66 | 0.62 | 0.63 | 0.61 | 0.64 | 0.10 |
| Tg | °C. | 682 | 700 | 679 | 685 | 654 | 672 | 671 | 670 |
| $P_T$ | °C. | 1304 | 1306 | 1303 | 1315 | 1269 | 1298 | 1296 | 1305 |
| Density | g/cm³ | 2.489 | 2.495 | 2.496 | 2.492 | 2.493 | 2.493 | 2.485 | 2.479 |
| Devitrification | °C. | 1285 | 1320 | 1245 | 1270 | 1215 | 1245 | 1265 | 1235 |

TABLE 3 ceramicization conditions and properties of transparent glass-ceramics according to the invention, examples 1 to 3, and comparative glass-ceramic, example 4

| Example No. | | 1 | 2 | 3 | 4 |
|---|---|---|---|---|---|
| Glass No. | | 1 | 2 | 3 | 4 |
| Ceramicization Program Nucleation | | 1 | 2 | 1 | 1 |
| TN | °C. | 770 | 790 | 765 | 765 |
| tN | min | 30 | 15 | 30 | 30 |
| T max | °C. | 905 | 903 | 898 | 898 |
| t max | min | 15 | 15 | 15 | 15 |
| Properties after ceramicization: Thermal expansion | | | | | |
| (α20/500 | 10⁻⁶/K | 1.0 | 1.2 | 1.1 | −0.1 |
| (α20/700 | 10⁻⁶/K | 1.0 | 1.3 | 1.1 | −0.03 |

TABLE 3-continued ceramicization conditions and properties of transparent glass-ceramics according to the invention, examples 1 to 3, and comparative glass-ceramic, example 4

| Example No. | | 1 | 2 | 3 | 4 |
|---|---|---|---|---|---|
| Transmission, standard light C, 2° | | | | | |
| Thickness | mm | 4 | 4 | 4 | 4 |
| 400 nm | % | 68.7 | 20.0 | 58.0 | 68.0 |
| 450 nm | % | 81.9 | 51.9 | 77.2 | 81.9 |
| 500 nm | % | 85.5 | 61.1 | 82.0 | 85.5 |
| 600 nm | % | 89.1 | 74.6 | 86.3 | 89.3 |

TABLE 3-continued ceramicization conditions and properties of transparent glass-ceramics according to the invention, examples 1 to 3, and comparative glass-ceramic, example 4

| Example No. | | 1 | 2 | 3 | 4 |
|---|---|---|---|---|---|
| 700 nm | % | 90.3 | 82.9 | 88.8 | 90.5 |
| 1600 nm | % | 88.5 | 73.3 | 88.9 | 89.0 |
| Light transmission Y | % | 87.6 | 68.8 | 84.3 | 87.8 |
| Yellowness index | | 8.0 | 31.4 | 10.4 | 8.2 |
| HQz phase content | % | 70 | 63 | 72 | 71 |
| Average crystallite size | nm | 46 | 51 | 52 | 34 |

TABLE 4

Ceramicization conditions and properties of transparent colored glass-ceramics according to the invention, examples 5 to 12, and comparative glass-ceramic, example 13

| | | Example No. | | | | | | | | |
|---|---|---|---|---|---|---|---|---|---|---|
| | | 5 | 6 | 7 | 8 | 9 | 10 | 11 | 12 | 13 |
| Glass No. | | 5 | 6 | 7 | 7 | 8 | 9 | 10 | 11 | 12 |
| Ceramicization Program | | 1 | 1 | 3 | 4 | 4 | 4 | 4 | 4 | 4 |
| Nucleation | | | | | | | | | | |
| TN | °C. | 775 | 775 | | | | | | | |
| tN | min | 30 | 30 | | | | | | | |
| T max | °C. | 899 | 911 | 920 | 900 | 900 | 850 | 870 | 900 | 900 |
| t max | min | 15 | 15 | 6 | 15 | 15 | 15 | 15 | 15 | 15 |
| Properties after ceramicization: | | | | | | | | | | |
| Thermal expansion | | | | | | | | | | |
| α20/500 | $10^{-6}$/K | 1.3 | 2.0 | 1.4 | 1.4 | 1.4 | 1.7 | 1.5 | 1.4 | — |
| α20/700 | $10^{-6}$/K | 1.3 | 2.0 | 1.4 | 1.4 | 1.5 | 2.0 | 1.6 | 1.5 | 0.18 |
| Transmission, standard light C, 2° | | | | | | | | | | |
| Thickness | mm | 4 | 4 | 3 | 3 | 3 | 3 | 3 | 3 | 4 |
| 400 nm | % | 0.3 | 0.3 | 0.6 | 0.5 | 0.6 | 0.01 | 0.2 | 0.05 | 0.3 |
| 450 nm | % | 0.4 | 0.4 | 0.9 | 0.7 | 0.75 | 0.05 | 0.6 | 0.3 | 0.3 |
| 500 nm | % | 0.4 | 0.4 | 0.9 | 0.7 | 0.7 | 0.1 | 0.6 | 0.4 | 0.3 |
| 550 nm | % | 0.8 | 0.9 | 1.7 | 1.3 | 1.3 | 0.4 | 1.0 | 0.9 | 0.7 |
| 630 nm | % | 5.1 | 5.2 | 7.4 | 6.4 | 6.4 | 2.0 | 4.0 | 3.8 | 4.5 |
| 700 nm | % | 17.9 | 18.0 | 21.4 | 19.6 | 19.7 | 6.8 | 12.0 | 10.8 | 16.7 |
| 1600 nm | % | 73.5 | 72.4 | 77.8 | 77.6 | 81.3 | 60.4 | 71.8 | 75.5 | 76.7 |
| Light transmission Y | % | 1.6 | 1.6 | 2.6 | 2.1 | 2.2 | 0.6 | 1.5 | 1.4 | 1.3 |
| HQz phase content | % | 63 | 57 | 62 | 62 | 55 | 48 | 58 | 69 | 62 |
| Average crystallite size | nm | 50 | 63 | 69 | 65 | 68 | 120 | 95 | 61 | 44 |

TABLE 5

Properties of undecorated and decorated glass-ceramic plates (thickness 3 mm) and comparative examples 18 to 21

| | | Example No. | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| Glass No. | | 7 | 7 | 7 | 7 | 13 | 13 | 13 | 13 | 3 | 3 | 3 | 3 |
| Decor | | | Glass flux/20% of TiO2 white pigment | | | | Glass flux/20% of TiO2 white pigment | | | | Glass flux/20% of black pigment | | |
| Decor layer thickness | μm | undec | 2.3 | 5.0 | 7.7 | undec | 2.5 | 5.4 | 8.0 | undec | 3.2 | 5.5 | 7.8 |
| Ceramicization and decor baking, program | | 3 | 3 | 3 | 3 | 3 | 3 | 3 | 3 | 1 | 1 | 1 | 1 |
| Nucleation | | | | | | | | | | | | | |
| $T_N$ | | | | | | | | | | 765 | 765 | 765 | 765 |
| $t_N$ | | | | | | | | | | 30 | 30 | 30 | 30 |
| $T_{max}$ | | 920 | 920 | 920 | 920 | 920 | 920 | 920 | 920 | 900 | 900 | 900 | 900 |
| $t_{max}$ | | 6 | 6 | 6 | 6 | 6 | 6 | 6 | 6 | 15 | 15 | 15 | 15 |
| Assessment of crack network | | — | 1 | 1-2 | 3 | — | 1-2 | 3 | 5 | — | — | — | — |
| Bending tensile strength | MPa | 125 | 62 | 41 | 35 | 149 | 35 | 30 | <30 | 169 | 75 | 53 | 49 |
| Remission Standard light C/2° (with decor) | | | | | | | | | | | | | |
| Lab L* | | | 25.0 | 61.6 | 73.9 | 79.6 | 24.4 | 61.8 | 74.3 | 80.4 | — | — | — |
| CIE Y | | | 4.4 | 30.0 | 46.6 | 56.1 | 4.2 | 30.2 | 47.1 | 57.5 | — | — | — |

TABLE 5-continued

Properties of undecorated and decorated glass-ceramic plates (thickness 3 mm) and comparative examples 18 to 21

| | Example No. | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| Light transmission, transmitted light Standard light C/2° (with decor) | | | | | | | | | | | | |
| Lab L* | 16.6 | 6.0 | 4.4 | 3.5 | 21.5 | 8.7 | 6.1 | 5.2 | 94.2 | 58.7 | 37.7 | 21.7 |
| CIE Y | 2.2 | 0.7 | 0.5 | 0.4 | 3.4 | 1.0 | 0.7 | 0.6 | 85.8 | 26.7 | 9.9 | 3.4 |

The invention claimed is:

1. A transparent or transparent colored lithium aluminum silicate (LAS) glass-ceramic article, comprising a glass-ceramic containing β-quartz solid solution as predominant crystal phase, wherein the glass-ceramic comprises in % by weight on an oxide basis:
   $Li_2O$ 2.0-<3.0;
   MgO 1.56-3;
   $Al_2O_3$ 19-23;
   $SiO_2$ 60-69;
   $TiO_2$ 0.5-6.0;
   $ZrO_2$ 0-<2.0;
   $SnO_2$ 0.1-0.6;
   ZnO not more than 3;
   $P_2O_5$ 0-3;
   $\Sigma Na_2O+K_2O$ 0-2;
   $\Sigma CaO+SrO+BaO$ 0.2-4;
   $\Sigma TiO_2+ZrO_2+SnO_2$ 3-6; and
   a condition that $MgO/Li_2O$>0.4, and has a thermal expansion in the range from room temperature to 700° C. of from 1.0 to $2.5 \cdot 10^{-6}$/K; and
   an inorganic decoration on the glass-ceramic, the inorganic decoration having a thermal expansion that is different from the thermal expansion of the glass-ceramic of less than $4 \cdot 10^{-6}$/K in the range from room temperature to 300° C.

2. The transparent or transparent colored lithium aluminum silicate glass-ceramic article as claimed in claim 1, wherein the thermal expansion in the range from room temperature to 700° C. is from 1.3 to $1.8 \cdot 10^{-6}$/K.

3. The transparent or transparent colored lithium aluminum silicate glass-ceramic article as claimed in claim 1, wherein the glass-ceramic further comprises a refining agent selected from the group consisting of $Sb_2O_3$ and $As_2O_3$ in an amount of from 0.1 to 2% by weight.

4. The transparent or transparent colored lithium aluminum silicate glass-ceramic article as claimed in claim 1, wherein the glass-ceramic does not include arsenic oxide except for unavoidable traces.

5. The transparent or transparent colored lithium aluminum silicate glass-ceramic article as claimed in claim 4, wherein the glass-ceramic does not include antimony oxide except for unavoidable traces.

6. The transparent or transparent colored lithium aluminum silicate glass-ceramic article as claimed in claim 1, wherein the glass-ceramic does not include antimony oxide except for unavoidable traces.

7. The transparent lithium aluminum silicate glass-ceramic article as claimed in claim 1, further comprising a light transmission of greater than 80%, wherein the glass-ceramic consists essentially of in % by weight on an oxide basis:
   $Li_2O$ 2.0-<3.0;
   $\Sigma Na_2O+K_2O$ 0.1-1.5;
   MgO 1.56-2.6;
   $\Sigma CaO+SrO+BaO$ 0.2-4;
   ZnO not more than 3;
   $B_2O_3$ 0-2;
   $Al_2O_3$ 19-23;
   $SiO_2$ 60-69;
   $TiO_2$ 0.5-2.5;
   $ZrO_2$ 0-<2;
   $P_2O_5$ 0-3;
   $SnO_2$ 0.1-0.6;
   $\Sigma TiO_2+ZrO_2+SnO_2$ 3-6;
   $Nd_2O_3$ 0-0.4; and
   $Fe_2O_3$ <0.03, wherein the condition $MgO/Li_2O$ is >0.5.

8. The transparent lithium aluminum silicate glass-ceramic article as claimed in claim 7, further comprising a refining agent selected from the group consisting of $Sb_2O_3$ and $As_2O_3$ in amounts of from 0.1 to 2% by weight.

9. The transparent colored lithium aluminum silicate glass-ceramic article as claimed in claim 1, further comprising a light transmission of less than 5%, wherein the glass-ceramic consists essentially of in % by weight on an oxide basis:
   $Li_2O$ 2.0-<3.0;
   $\Sigma Na_2O+K_2O$ 0.1-1.5;
   MgO 1.56-2.6;
   $\Sigma CaO+SrO+BaO$ 0.2-4;
   ZnO not more than 3;
   $B_2O_3$ 0-2;
   $Al_2O_3$ 19-23;
   $SiO_2$ 60-69;
   $ZrO_2$ 0-<2;
   $P_2O_5$ 0-3;
   $SnO_2$ 0.1-0.6; and
   $\Sigma TiO_2+ZrO_2+SnO_2$ 3-6;
   $V_2O_5$ 0.01-0.06, wherein the condition $MgO/Li_2O$ is >0.5.

10. The transparent lithium aluminum silicate glass-ceramic article as claimed in claim 9, further comprising a refining agent selected from the group consisting of $Sb_2O_3$ and $As_2O_3$ in amounts of from 0.1 to 2% by weight.

11. The transparent colored lithium aluminum silicate glass-ceramic article as claimed in claim 1, further comprising a processing temperature $P_T$ below 1320° C., an upper devitrification limit at least 15° C. below $P_T$, a light transmission of less than 5%, and the glass-ceramic comprising in % by weight on an oxide basis:
   $Li_2O$ 2.0-<3.0;
   $Na_2O$ 0.1-1;
   $K_2O$ 0.1-1;
   $\Sigma Na_2O+K_2O$ 0.2-1.5;

MgO 1.56-2.6;
CaO 0.1-1;
SrO 0-1;
BaO 0-3;
ΣCaO+SrO+BaO 0.2-4;
ZnO 0-2.5;
$B_2O_3$ 0-1;
$Al_2O_3$ 19-23;
$SiO_2$ 62-67;
$TiO_2$ 2.5-6;
$P_2O_5$ 0-1.5;
$SnO_2$ 0.1-0.4;
Σ$TiO_2$+$ZrO_2$+$SnO_2$ 4.2-6;
$V_2O_5$ 0.01-0.05;
$Fe_2O_3$ 0.05-0.3; and
a condition that $Fe_2O_3/V_2O_5$>2, wherein the condition that MgO/$Li_2O$ is >0.5, and wherein the composition is without the refining agents arsenic oxide and antimony oxide.

12. The transparent or transparent colored lithium aluminum silicate glass-ceramic article as claimed in claim 1, comprising a form of a plate.

13. The transparent or transparently colored lithium aluminum silicate glass-ceramic article as claimed in claim 12, wherein the plate is coated on at least one side over its entire area or part of its area by the inorganic decoration.

14. The transparent or transparently colored lithium aluminum silicate glass-ceramic article as claimed in claim 13, wherein the coated plate has a bending tensile strength of greater than 50 MPa at a layer thickness of the inorganic decoration of at least 3 urn.

15. The transparent or transparently colored lithium aluminum silicate glass-ceramic article as claimed in claim 13, wherein the inorganic decoration has a layer thickness of greater than 5 μm with a bending tensile strength of the coating plate being at least 35 MPa.

16. The transparent or transparent colored lithium aluminum glass-ceramic article as claimed in claim 1, wherein the article is configured for use as a device selected from the group consisting of a chimney sight window, a fire protection glazing, a display panel, a safety glazing, a cooking surface having a visually opaque colored underside coating in transparent form, and a cooking surface in transparent colored form.

17. The transparent or transparent colored lithium aluminum silicate glass-ceramic article as claimed in claim 1, wherein the article is configured for use as a cooking surface, wherein the cooking surface has a light transmission in a visible region of from 0.5 to 2.5% and a transmission of greater than 0.1% in a region of visible light over the entire wavelength range from 450 nm upward.

18. The transparent or transparent colored lithium aluminum silicate glass-ceramic article as claimed in claim 17, comprising transmission values of:
>0.15% at 450 nm;
>0.15% at 500 nm;
>0.25% at 550 nm;
2-12% at 630 nm; and
a light transmission in the visible region of 0.7-2.5%.

19. The transparent or transparent colored lithium aluminum silicate glass-ceramic article as claimed in claim 17, comprising a temperature difference resistance of less than 600° C.

20. The transparent or transparent colored lithium aluminum silicate glass-ceramic article as claimed in claim 1, wherein the glass-ceramic further comprises $Sb_2O_3$ in an amount of from 0.1 to 2% by weight.

21. The transparent or transparent colored lithium aluminum silicate glass-ceramic article as claimed in claim 1, wherein the condition that MgO/$Li_2O$ is ≤0.66.

* * * * *